United States Patent
Yamada et al.

(10) Patent No.: US 7,191,825 B2
(45) Date of Patent: Mar. 20, 2007

(54) SEPARATELY AIR-CONDITIONABLE VEHICLE AIR CONDITIONING UNIT

(75) Inventors: Koji Yamada, Kariya (JP); Keizo Goto, Kariya (JP)

(73) Assignee: Denso Corporation, Kariya (JP)

(*) Notice: Subject to any disclaimer, the term of this patent is extended or adjusted under 35 U.S.C. 154(b) by 292 days.

(21) Appl. No.: 10/718,056

(22) Filed: Nov. 20, 2003

(65) Prior Publication Data

US 2004/0194946 A1 Oct. 7, 2004

(30) Foreign Application Priority Data

Nov. 20, 2002 (JP) .............................. 2002-336586

(51) Int. Cl.
*F25B 29/00* (2006.01)
*B60H 1/00* (2006.01)
*B60H 3/00* (2006.01)

(52) U.S. Cl. ..................... 165/203; 165/42; 165/43; 165/903; 454/156; 454/160; 454/161; 237/12.3 A; 237/12.3 B

(58) Field of Classification Search ................ 165/203, 165/42, 43, 903; 454/156, 160, 161; 237/12.3 A, 237/12.3 B
See application file for complete search history.

(56) References Cited

U.S. PATENT DOCUMENTS 5,101,883 A * 4/1992 Kinmartin et al. ............ 165/42

FOREIGN PATENT DOCUMENTS

| GB | 2396690 A | * | 6/2004 |
| JP | 05301515 A | * | 11/1993 |
| JP | 07293710 A | * | 11/1995 |
| JP | 8-48128 | | 2/1996 |
| JP | 09039546 A | * | 2/1997 |
| JP | 11048753 A | * | 2/1999 |
| JP | 11189024 A | * | 7/1999 |

* cited by examiner

Primary Examiner—John K. Ford
(74) Attorney, Agent, or Firm—Harness, Dickey & Pierce, PLC

(57) ABSTRACT

A vehicle air conditioning unit includes an air duct, through which air is blown into a passenger compartment, and a partition board, which partitions the air duct in its inside into a first air passage and a second air passage. Temperature of air in the first air passage and temperature of air in the second air passage can be separately controlled. The air duct has a recess on its one side. An air conditioning device is disposed in the recess. The partition board is deformed correspondingly to the recess so that a corresponding cross-sectional area of the first air passage and a corresponding cross-sectional area of the second air passage should be approximately equal.

10 Claims, 3 Drawing Sheets

3A(3)

3A

SEPARATELY AIR-CONDITIONABLE VEHICLE AIR CONDITIONING UNIT

CROSS REFERENCE TO RELATED APPLICATION

This application is based on and incorporated herein by reference Japanese Patent Application No. 2002-336586 filed on Nov. 20, 2002.

FIELD OF THE INVENTION

The present invention relates to a vehicle air conditioning unit that can separately control temperature in a driver's compartment and that in a front passenger compartment.

BACKGROUND OF THE INVENTION

A conventional vehicle air conditioning unit, for example, is described in JP-A-H8-48128. As shown in FIG. 4, this vehicle air conditioning unit has a duct 100, through which air is introduced into inside of a vehicle. The duct 100 is partitioned in its inside by a partition board 110 into a driver side air passage 120 and a front passenger side air passage 130. Moreover, air mix doors (not shown) are provided for the respective air passages 120, 130. The respective air mix doors are separately controlled, thereby being capable of separately controlling the respective temperatures in the air passages 120, 130. Moreover, the vehicle air conditioning unit has FACE air outlets 170, respectively formed in the air passages 120, 130, FOOT air outlets 160, respectively formed in the air passages 120, 130, and an air outlet switching door (not shown) for switching the openings of the air outlets 170, 160. The air outlet switching door is provided only one and commonly used for the air passages 120, 130. Therefore, an actuator 140 for driving the air outlet switching door is disposed on one side of the duct 100.

Recently, a vehicle air conditioning unit, particularly, a rear air conditioning unit is required to be downsized in order to enlarge the passenger compartment of a vehicle. For example, a structure shown in FIG. 5 is employed, in which a recess 150 is formed in a side part of the duct 100 and the actuator 140 is disposed in the recess 150. Accordingly, this air conditioning unit is more compact than that shown in FIG. 4, and thereby the passenger compartment can be downsized.

However, the above vehicle air conditioning units, which can separately control the temperatures in the respective air passages 120, 130, are suitable to employ a symmetrical duct shape for preserving the balance between the temperatures and between the amounts of the blowing air in the respective air passages 120, 130. In the vehicle air conditioning unit shown in FIG. 4, the recess 150 is formed in the side part of the duct 100, thereby making the corresponding cross-sectional areas of the left and right side air passages 120, 130 different. Therefore, the amounts of air blowing in the left side air passage 120 and in the right side air passage 130 are unbalanced, and thereby the temperature control performance is disadvantageously lowered.

SUMMARY OF THE INVENTION

The present invention is considered in view of the above circumstances and provides a vehicle air conditioning unit that occupies less space and can preserve the balance between the amounts of the blowing air in respective air passages.

According to the present invention, a vehicle air conditioning unit includes an air duct, through which air is blown into a passenger compartment, and a partition board, which partitions the air duct in its inside into a right side air passage and a left side air passage. Temperature of air in the right side air passage and temperature of air in the left side air passage can be separately controlled. The air duct has a recess on its one side. An air conditioning device is disposed in the recess. The partition board is deformed correspondingly to the recess so that a corresponding cross-sectional area of the right side air passage and a corresponding cross-sectional area of the left side air passage should be approximately equal.

The air conditioning device is disposed in the recess of the air duct, thereby making the vehicle air conditioning unit more compact. Moreover, the partition board is deformed corresponding to the recess of the air duct, thereby allowing the corresponding cross-sectional areas of the right side air passage and the left side air passage to be approximately equal. Accordingly, the left and right amounts of the blowing air can be balanced, and the temperature control performance can be kept.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PREFERRED EMBODIMENT

Figure 1:
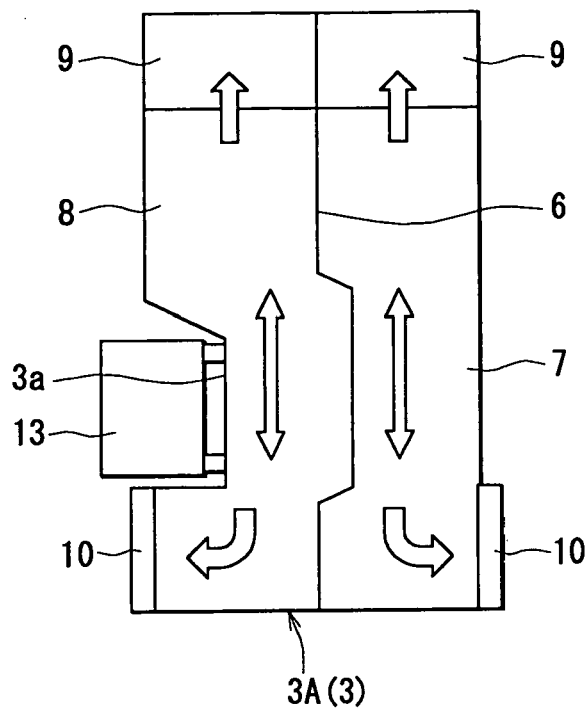
FIG. 1 is a schematic diagram of an air duct of a rear air conditioning unit according to an embodiment of the present invention.

An embodiment of the present invention will be described with reference to FIGS. 1 and 2.

A vehicle air conditioning unit explained in this embodiment is a rear air conditioning unit 1 for air-conditioning a rear passenger compartment. As shown in FIG. 2, the air conditioning unit 1 is provided with a blower 2 for generating an airflow, a duct 3 for introducing air supplied from the blower 2 into the passenger compartment, an evaporator 4 disposed inside the duct 3, a heater core 5 disposed inside the duct 3 downstream from the evaporator 4, air mix doors (not shown) for regulating temperature of blowing air.

The duct 3 is constructed with a cooler case (not shown), which houses the evaporator 4, and a heater case 3A, which houses the heater core 5 and the air mix doors. As shown in FIG. 1, the heater case 3A is partitioned by a partition board 6 in its inside into a right side air passage 7 (first air passage) and a left side air passage 8 (second air passage).

The heater case 3A has FACE air outlets 9, from which conditioned air is blown toward the upper body of a rear passenger, FOOT air outlets 10, from which conditioned air is blown toward the feet of the rear passenger, and an air outlet switching door 11 (see FIG. 2), which switches between the openings of the FACE air outlets 9 and the FOOT air outlets 10. The FACE air outlets 9 and the FOOT air outlets 10 are respectively provided for the right side air passage 7 and the left side air passage 8. However, the air outlet switching door 11 is commonly used. Moreover, the air outlet switching door 11 is driven by a servo motor 13 (air conditioning device) through a link mechanism 12.

Figure 2:
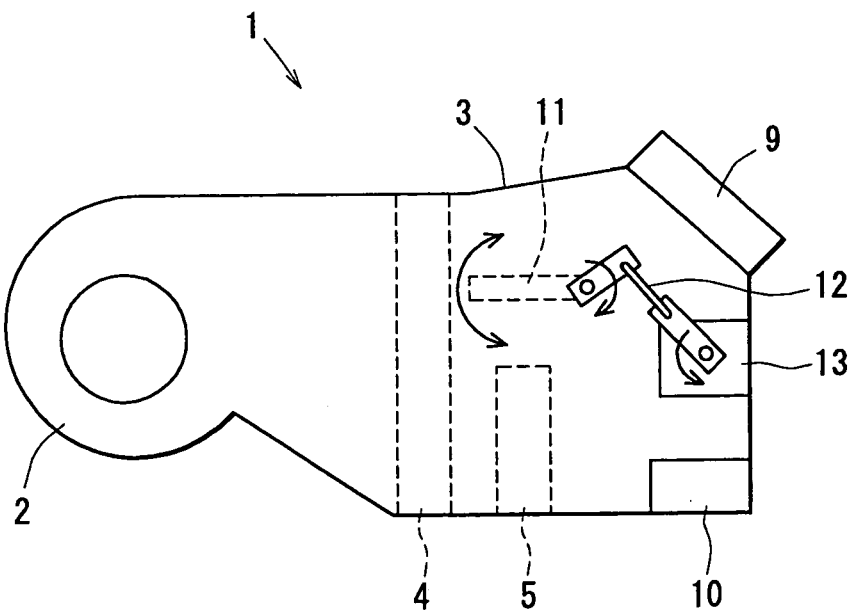
FIG. 2 is a schematic side of the rear air conditioning unit.

As shown in FIG. 1, the heater case 3A has a recess 3a in its left side, in which the servo motor 13 is disposed. The partition board 6, partitioning the heater case 3A in its inside, is deformed to have a substantial recess corresponding to the recess 3a of the heater case 3A. Accordingly, the corresponding cross-sectional areas of the right side air passage 7 and the left side air passage are approximately equal.

The evaporator 4 is one of functional components of a refrigeration cycle. Low temperature refrigerant circulating inside the evaporator 4 absorbs heat from blowing air passing therethrough, thereby cooling the blowing air.

The heater core 5 is a heat exchanger that heats the blowing passing therethrough by engine coolant serving as a heat reservoir and is connected with an engine cooling channel with the use of a hot water piping.

The air mix doors, which are respectively disposed in the right and left side air passages 7, 8, relatively control the amount of air passing through the heater core 5 (hot air) and the amount of air bypassing the heater core 5 (cool air), thereby regulating the temperature of the blowing air. The respective air mix doors can be separately driven by their own actuators (not shown), thereby being capable of separately regulating the temperatures of the blowing air in the respective air passages 7, 8.

Hereinafter, the effect of the rear air conditioning unit 1 will be described.

The heater case 3A has the recess 3a in the left side, in which the servo motor 13 is disposed, thereby preventing the servo motor 13 from projecting outward from the heater case 3A. Accordingly, the space occupied by the rear air conditioning unit 1 can be downsized. On the ground that the size of the rear air conditioning unit 1 affects the size of the passenger compartment, the passenger compartment can be enlarged by downsizing the space occupied by the rear air conditioning unit 1.

Moreover, deforming the partition board 6 correspondingly to the recess 3a can make the corresponding cross-sectional areas of the right and left side air passages 7, 8 approximately equal. Accordingly, the left and right amounts of the blowing air can be balanced, and thereby the desired temperature control performance can be kept.

(Modifications)

In the above embodiment, the servo motor 13 for driving the air outlet switching door 11 is disposed in the recess 3a of the heater case 3A. However, the recess 3a can be, for example, used for storing a refrigerant piping connected to the evaporator 4 or the hot water piping connected to the heating core 5.

Moreover, the present invention is applied for the rear air conditioning unit 1 but can be instead applied for a front air conditioning unit or an air conditioning unit disposed in a console.

Figure 3:
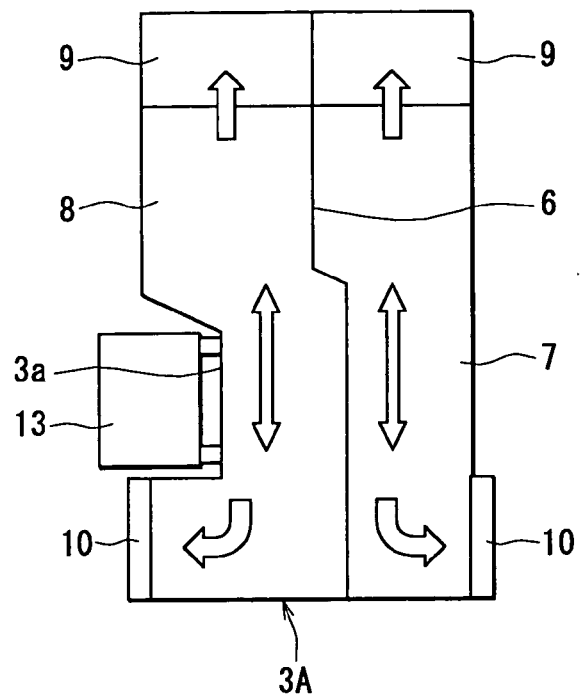
FIG. 3 is a schematic diagram of an air duct of a rear air conditioning unit according to a modification of the present invention.
Figure 4:
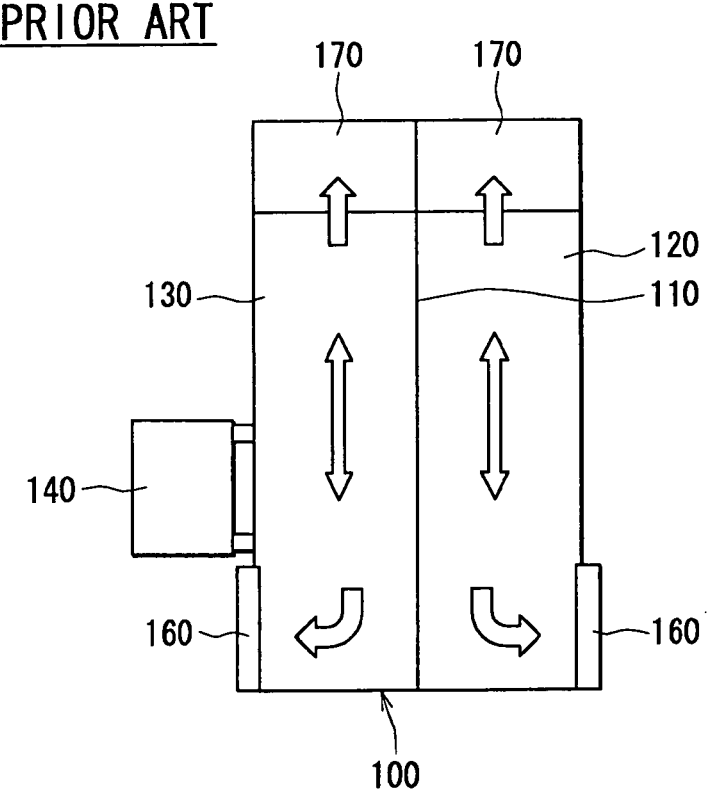
FIG. 4 is a schematic diagram of an air duct of an air conditioning unit according to a prior art.
Figure 5:
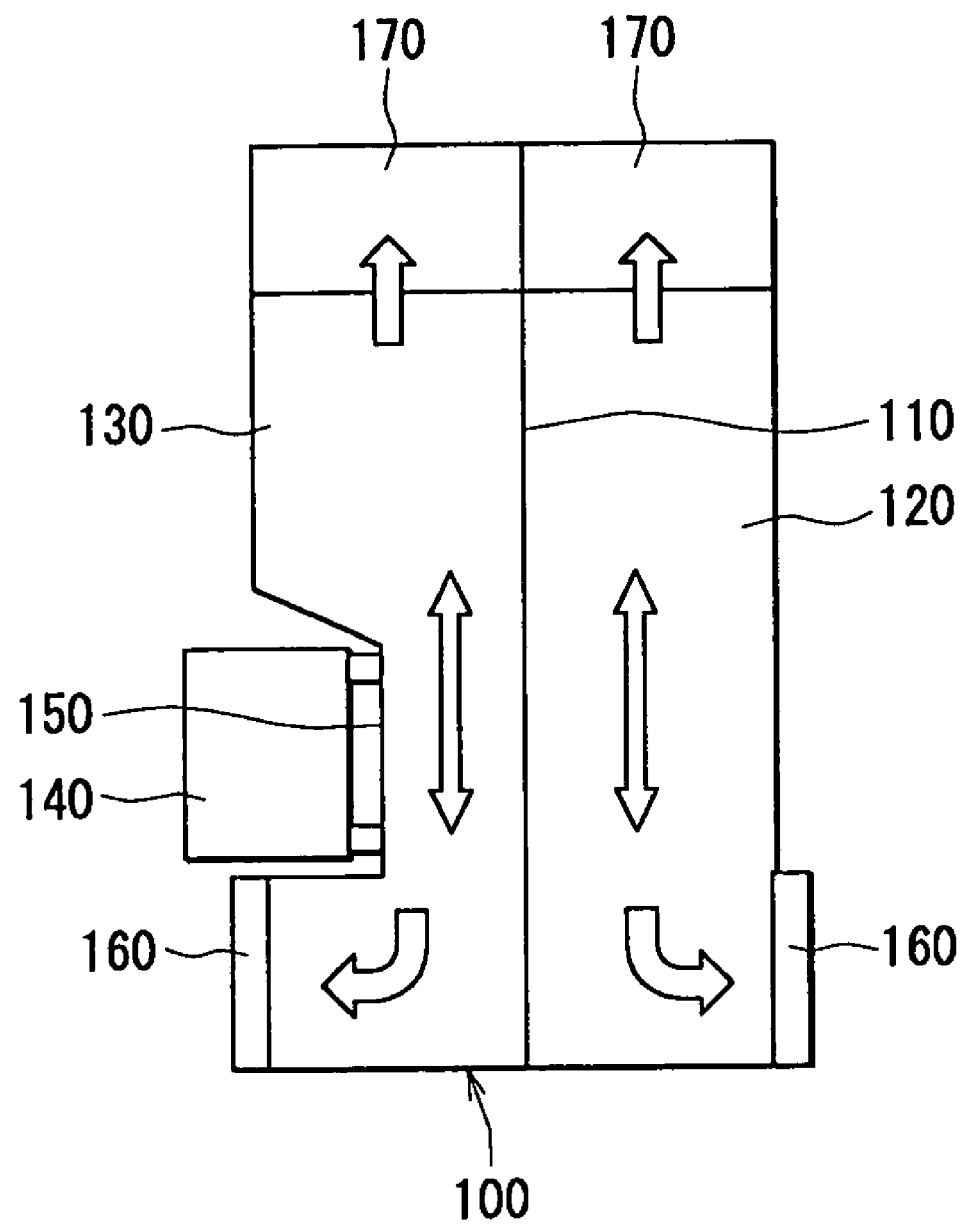
FIG. 5 is a schematic diagram of an air duct of an air conditioning unit according to a related art.

Further, regarding to the deformed shape of the partition board 6, as shown in FIG. 1, the partition board 6 has a substantial recess corresponding to the recess 3a. However, as shown in FIG. 3, the partition board 6 may be deformed to have a stepped shape, in which a part of the partition board 6 corresponding to the recess 3a is flatly extended downward.

What is claimed is:

1. A vehicle air conditioning unit for a vehicle including a passenger compartment, the vehicle air conditioning unit comprising:

an air duct, through which air is blown into the passenger compartment;

a partition board which partitions the air duct in its inside into a first air passage and a second air passage, the partition board defining a first portion, a second portion and a stepped portion disposed between the first and second portions, the first portion being generally parallel to the second portion;

a first air outlet formed in the first air passage;

a second air outlet formed in the second air passage;

an air outlet switching door which simultaneously controls openings of the first air outlet and the second air outlet; and drive means for driving the air outlet switching door, wherein temperature of air in the first air passage and temperature of air in the second air passage can be separately controlled;

the air duct has a recess on its one side;

an air conditioning device is disposed in the recess, wherein the air conditioning device is the drive means; and the stepped portion of the partition board is deformed in a manner similar to the recess in the air duct so that a cross-sectional area of the first air passage and a cross-sectional area of the second air passage remain approximately equal.

2. A vehicle air conditioning unit according to claim 1 wherein the stepped portion of the partition board is deformed to have a recess similar to the recess in the air duct.

3. A vehicle air conditioning unit according to claim 1, wherein the partition board has at least two surfaces parallel with each other in an air flow direction due to the stepped shape.

4. A vehicle air conditioning unit according to claim 1, wherein the recess in the air duct defines a recess wall generally parallel with an outside wall of the air duct in an air flow direction.

5. A vehicle air conditioning unit according to claim 1, wherein the stepped portion defines a stepped wall generally parallel with the first and second portion.

6. A vehicle air conditioning unit for a vehicle including a passenger compartment, the vehicle air conditioning unit comprising:

an air duct having a side wall through which air is blown into the passenger compartment;

a partition board substantially parallel to the sidewall which partitions the air duct in its inside into a first air passage and a second air passage, the partition board defining a first portion, a second portion and a stepped portion disposed between the first and second portions, the first portion being generally parallel to the second portion;

a first air outlet formed in the first air passage;

a second air outlet formed in the second air passage;

an air outlet switching door which simultaneously controls openings of the first air outlet and the second air outlet; and drive means for driving the air outlet switching door, wherein temperature of air in the first air passage and temperature of air in the second air passage can be separately controlled;

the air duct has a first recess in the sidewall;

an air conditioning device is disposed in the first recess, wherein the air conditioning device is the drive means; and the stepped portion of the partition board has a second recess opposite to the first recess so that a cross-sectional area of the first air passage and a cross-sectional area of the second air passage are approximately equal in the vicinity of the first and second recesses.

7. A vehicle air conditioning unit according to claim 6 wherein the shape of the second recess of the partition board substantially corresponds to the shape of the first recess in the air duct.

8. A vehicle air conditioning unit according to claim 6, wherein the partition board has at least two surfaces parallel with each other in an air flow direction due to the stepped shape.

9. A vehicle air conditioning unit according to claim 6, wherein the first recess in the air duct defines a recess wall generally parallel with the side wall of the air duct in an air flow direction.

10. A vehicle air conditioning unit according to claim 6, wherein the stepped portion defines a stepped wall generally parallel with the first and second portion.

* * * * *